Figure 1:
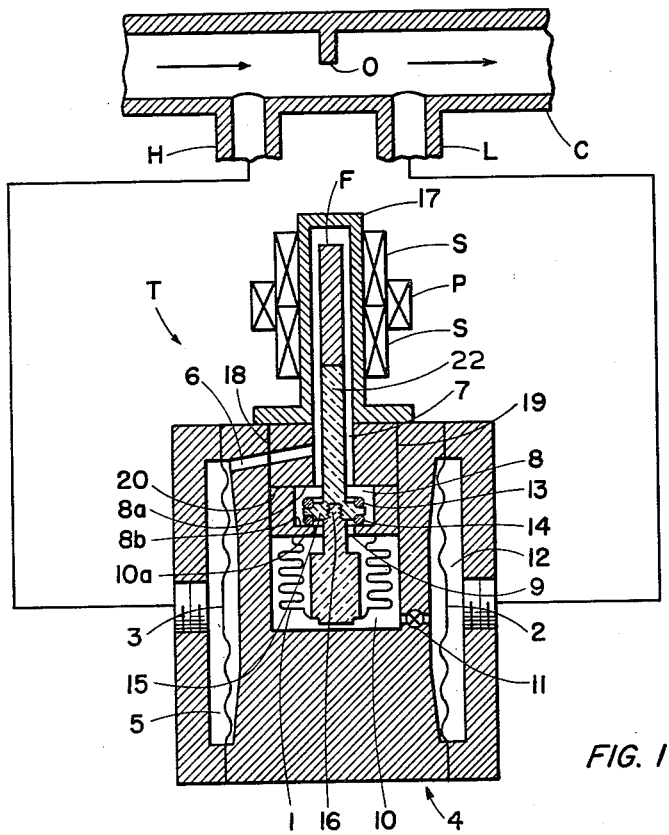

July 31, 1962  D. J. ALDINGER  3,047,022

PRESSURE RESPONSIVE DEVICE

Filed Dec. 24, 1958

INVENTOR.
Donald J. Aldinger
BY P. J. Young, Jr.

3,047,022
Patented July 31, 1962

3,047,022
PRESSURE RESPONSIVE DEVICE
Donald J. Aldinger, Webster, N.Y., assignor to Taylor Instrument Companies, Rochester, N.Y., a corporation of New York
Filed Dec. 24, 1958, Ser. No. 782,832
5 Claims. (Cl. 137—784)

This invention relates to pressure responsive devices, in particular to differential pressure responsive devices of the liquid-filled type having a plurality of flexible walls some of which are exposed to the pressures of which the difference is to be sensed for control, indication, or the like.

The main object of the invention is to provide a novel and inventive differential pressure responsive device adapted to be coupled to the aforesaid pressures and to produce a motion output of an order suitable for positioning the core of a differential transformer, for operating a mechanical linkage, and so on.

One basic solution to this problem is to apply the pressures involved to a movable wall, say, a metallic bellows, wherein the inherent spring characteristic of the said bellows, often supplemented by a range spring or the like, absorbs by its elastic deformation or strain the excess of one pressure over the other.

It is not difficult to provide a bellows, the effective spring characteristic of which (counting the spring characteristic of a range spring as part of the bellows spring characteristic, if an auxiliary spring be provided) is such that the range of bellows deformation envisaged in operation provides a range of output motions of the type sought for, while not exceeding limits beyond which appreciable hysteresis and non-linearity degrade the bellows' response to pressure.

However, a number of practical difficulties arise in the application of a simple bellows device to the task of pressure measurement. Some important difficulties may be listed as follows:

(1) It may be undesirable to allow the fluid or fluids in which arise the pressures involved to contact the bellows or the mechanism operated by said bellows. For example, a corrosive fluid may be involved, or one that carries solids which can deposit in the bellows corrugations.

(2) Difficulty is encountered in properly applying overrange stops, valves, etc., for the purpose of protecting the bellows from being damaged by pressure differences in excess of the range over which the bellows is designed to operate.

(3) Bellows-deformation involves a volumetric displacement which may cause head-errors in lines connecting the bellows to its actuating pressures. For example, the bellows may be connected to process lines in which is maintained a seal liquid having a density different from that of the fluid or fluids in which arise the pressures of which the difference is to be measured. In such case, the volumetric displacement of the bellows in response to a difference in pressure can result in loss of seal liquid from one or another of the connecting lines, which loss may seriously unbalance liquid heads in the connecting lines and cause the bellows' apparent differential pressure response to include an undesired component due to head difference.

One prior art solution to items 1 and 2 has been to provide slack sealing diaphragms between which the bellows is contained, a filling liquid being provided between each diaphragm and the bellows so that a pressure exerted on the exterior of one diaphragm is transmitted hydraulically to the bellows and to the other diaphragm, whereby if an overrange valve is provided, the liquid provides a rigid support for the bellows and diaphragm when such valve acts.

A solution to the third item, sometimes combined with the said one solution, is to allow for minute movements only of the pressure responsive wall or walls by making the bellows or the center wall very stiff (even absolutely stiff, in effect, by providing force-balancing means whereby the bellows or wall is substantially continuously forced by some external source of energy, acting in response to bellows or wall movement, to resume very nearly a null position) so that the differential pressure response of the center wall is an extremely small motion. Such expedients require use of sensing devices such as baffle-nozzle couples, strain gages, and other detector devices in combination with various amplifying devices.

However, these prior art practices have inherent disadvantages. The slack-diaphragm approach generally entails use of plastic, rubber or other non-metallic diaphragms which, while quite slack, are in effect porous membranes allowing diffusion of process fluid therethrough to an extent which often will become appreciable over a period of time. Such materials also have relatively narrow limitations as to thermal stability of the substances from which they are made. Again, a slack diaphragm has no or little effect on volumetric displacement since, to the extent that it is slack, i.e., possesses no spring effect, a slack diaphragm acts as if it is part of the fluids which it separates.

As for the prior art solution to item 3, it is obvious that movement of the differential pressure element must be so small, in order to satisfactorily minimize volumetric displacement effects, that such movement must somehow be amplified before a motion output capable of driving the core of a typical differential transformer, or some simple reliable linkage, can be obtained.

According to my invention, I provide metal sealing diaphragms of considerable stiffness and proportioned as to diaphragm area and stiffness so that the range of pressure differences to be sensed does not result in a net volumetric displacement by the diaphragms greater than some predetermined design value and, in order to obtain a relatively large motion output from the diaphragm response, I provide hydraulic amplification of diaphragm deflection, a feature most conveniently embodied in the form of a bellows of such small effective area that small volumetric displacements of liquid by the diaphragms, if hydraulically coupled to the bellows, will create a relatively large deformation of the bellows. Thus, one of the pressures between which the difference is to be sensed, is coupled to one side of one of said diaphragms, while the other side of the said diaphragm is hydraulically coupled to the said bellows, whereby the deflection of the bellows end is to the deflection of the diaphragm as the effective area of the latter is to the effective area of the former. Similarly, the exterior of said bellows and one side of the other of said diaphragms are hydraulically coupled, and the other side of said other diaphragm is exposed to the other of said pressures, whereby, the net deflection of said bellows will be proportional to the difference in magnitude of the said pressures.

Since it is convenient to utilize a bellows that is quite flexible relative to the said diaphragms, it results that the form of my invention just described is substantially the opposite of its prior art counterpart; namely, the latter in effect concentrates the stiffness of the overall differential pressure responsive device in a differential pressure responsive element sandwiched between slack sealing diaphragms. In my invention, on the other hand, the stiffness of the overall device is assigned mainly to the sealing diaphragms, while the differential pressure responsive element per se (i.e., the aforesaid bellows) contributes or needs contribute little to the stiffness of the overall device beyond whatever stiffness is entailed by the material from which it is constructed.

As a result, a differential pressure responsive device according to my invention has the desirable characteristics of low volumetric displacement and large linear motion output, whereas insofar as I am aware, its prior art counterparts cannot provide these characteristics without complex mechanical linkages, and other expedients not required by my invention.

Figure 2:
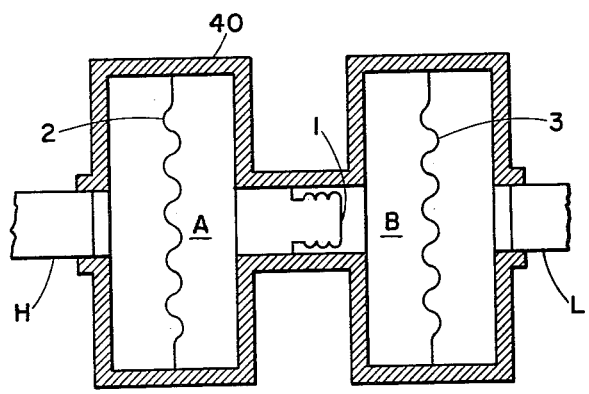

Turning now to a detailed description of my invention, FIGURE 1 in the drawing illustrates a sectional view of a differential pressure responsive device according to my invention; FIGURE 2 corresponds to FIGURE 1 highly schematicized for the purpose of illustrating the principle of the invention.

In FIGURE 1, an orifice or other flow restricting device O in a conduit C drops the line pressure of a fluid or fluid-like medium flowing through the said conduit, the direction of flow being indicated by the arrows. To measure the drop across the orifice O, a connecting conduit H and a connecting conduit L respectively communicate the higher line pressure and the lower line pressure to a differential pressure transmitter T according to the invention.

The motion output element of the transmitter T is a corrugated bellows 1 capable of a relatively large linear motion in response to a given difference between the pressure outside the bellows and the pressure inside the bellows. As an illustration, what is transmitted is an electrical signal from a differential transformer comprising a pair of secondary windings S and a primary winding P, said windings being magnetically linked by a ferrous core F mounted on a stem 22 arranged to be moved by bellows 1. Such transformers being well known, it is not necessary to describe their action save to note that movement of core F from a neutral position relative to windings S changes the flux linkage between windings S and winding P so as to produce an electrical signal in a circuit (not shown, but including windings S), said signal having a sense and magnitude corresponding to the sense and extent of movement of core F from neutral position.

In this case, it may be envisaged that a core movement of 0.120 inch may be necessary to produce the entire range of electrical signals available from the differential transformer, and therefore bellows 1 is chosen to be capable of thus moving said core in linear proportion to the pressure difference across said orifice through a given range of pressure differences.

Bellows 1 is not connected directly across the pressures in connections H and L, but is instead arranged between a pair of metal diaphragms 2 and 3 having predetermined spring constants whereby the range of motion of the bellows 1 in response to pressures coupled thereto by the diaphragms 2 and 3 is determined by the diaphragm spring constants and effective areas upon which the pressures act, and the bellows spring constant and effective area. To this end, bellows 1 and diaphragms 2 and 3 are supported in a body 4 which forms a more or less intricate passage that could conduct fluid from the high side of the orifice O to the low side of the orifice O but for the diaphragm 3, bellows 1 and diaphragm 2 arranged serially in such passage in that order so as to block flow of fluid through, while permitting a small volumetric displacement of fluid by the elastic deformation of diaphragms and bellows due to the pressure difference across orifice O.

For example, the high pressure from connection H is admitted to a chamber 5 in body 4 and deflects diaphragm 3 to the right. In order to transmit the deflection of diaphragm 3 to bellows 1, a liquid fill is provided solidly, i.e., entirely filling the portion of chamber 5 to the right of diaphragm 3, passage 6, chamber 7, chamber 8, passage 9 and the bellows interior, chamber 7 being extended upward as the interior of a tube 17 upon which the windings P and S are arranged and in which core F moves as set out above. Tube 17 is constructed of non-magnetic material, such as stainless steel, which does not interfere with the flux linkage of core F and the transformer windings. Accordingly, deflection of diaphragm 3 to the right displaces liquid via the above named passages and chambers, in the order named, into the interior of bellows 1, extending said bellows by an amount proportional to the displacement of liquid from chamber 5, whereby core F moves to change the magnetic coupling between the winding P and the windings S.

The remainder of the overall fluid passage through body 4 consists of chamber 10 into which bellows 1 projects, adjustably-restricted passage 11 and the chamber 12, connected in the order named and solidly filled with liquid from and including chamber 10 to and including the portion of chamber 12 to the left of the diaphragm 2. Hence, extension of bellows 1, as aforesaid, displaces liquid from chamber 10 through restricted passage 11 into the left portion of chamber 12, thus forcing the diaphragm 2 to deflect to the right into the right-hand portion of chamber 12. Obviously, if the higher pressure were admitted to the portion of chamber 12 to the right of diaphragm 2, the just-described chain of events would be reversed with the result that bellows 1 would be compressed and liquid would be forced into the portion of chamber 5 to the right of diaphragm 3.

The purpose of chamber 8 in FIGURE 1 is to provide overrange protection for bellows 1 in conjunction with a pair of O-rings 13 and 14 mounted on either side of a flange or collar 15 on stem 22.

The top and bottom of chamber 8 limit the axial motion of stem 22, so that extreme upward or downward motions of the stem respectively cause O-ring 13 to be compressed by flange 15 against the top wall 8a of chamber 8 and form a seal around passage 7 where this last opens into the top wall of chamber 8, or cause O-ring 14 to seal passage 9 where it opens into the bottom wall 8b of chamber 8. It will be noted that when O-ring 13 seals, due to a pressure in line L enough higher than the pressure in line H to compress bellows 1 to the limit permitted by O-ring 13 and collar 15, the sealing action of O-ring 13 maintains a supporting body of liquid within the bellows 1 which prevents the high pressure from crushing the bellows and/or diaphragm 2. On the other hand, if O-ring 14 acts to seal passage 9, overranging pressure in line H is prevented from entering bellows 1 and bursting it, while at the same time a rigid liquid support is provided for diaphragm 3.

The purpose of adjustably-restricted passage 11 is in accordance with the usual practice, i.e., a needle-valve or equivalent adjustable restrictor is provided to damp the response of the bellows and diaphragm arrangement as a whole to undesirable pressure fluctuations. To the same end, passage 6 could be restricted instead of passage 11.

The liquid used as a fill should be chemically inert, and have a clean, free-flowing character under reasonably foreseeable conditions of use.

As implied in discussing the function of the overrange valve, the pressure connections to the device of FIGURE 1 could be reversed. In fact, it is often preferred to admit the pressure expected to be normally higher than the other pressure to the chamber 12, and the said other pressure to chamber 5, in order that bellows 1 normally be compressively strained, rather than stretched or expanded. However, other than for the normal sense of the strain in bellows 1 due to pressure differences, the net result is the same regardless of which side of the device is chosen to be the higher pressure side.

In constructing the body 4, it is convenient to arrange the parts thereof so that tube 17 and that portion of he body including he chamber 8 and the top wall 10a of chamber 10 is separable from the rest of the body whereby bellows 1, stem 22, etc. are separable as a whole, and also so that the top wall 8a of chamber 8 and tube 17 can be separated from the bellows-supporting portion of the removed structure. Hence, it is convenient to divide stem 22 into a part more or less permanently connected to the bellows 1, and a part including the overrange valve elements and core F, this division being indicated by a threaded joint 16. The lines, 18, 19 and 20 indicate possible boundaries between body parts that would permit the type of assembly just described. This construction is desirable since it is convenient to braze the open end of bellows 1 to the body part supporting it after the stem portion in the bellows (which portion is made as large as possible to cut down the bellows volume) has been assembled with the bellows.

These features of assembly are also reasons for having both of O-rings 14 in chamber 13, rather than (as might appear desirable upon first sight) to utilize the top wall 10a of chamber 10 and the bottom wall 8b of chamber 8 as the valve seats, so that the valve structure would straddle passage 9. While such construction would function insofar as overrange protection is concerned as well as the illustrated construction, assembly (and maintenance) difficulties would be created by having part of the overrange valve inside the bellows. With the valve means located entirely within one chamber, i.e., between seats, assembly and maintenance difficulties are at a minimum.

FIGURE 2 illustrates the structural essence of the arrangement just described, i.e., diaphragm 2 and bellows 1, and bellows 1 and diaphragm 3 define liquid filled high pressure chambers A and B, respectively, in a body 40 corresponding to body 4 shorn of substantially all features of structure such as are only incidental to the pressure-response function per se. Thus, if diaphragm 2 is forced by pressure inwardly of chamber A, a comparatively slight linear displacement to the right (as shown in FIGURE 2) of this diaphragm (and of diaphragm 3) would occur, whereas the bellows 1 would convert the slight volume displacement accompanying said linear displacement into a relatively large linear displacement to the right of the bellows as said bellows deforms inwardly of chamber B and outwardly of chamber A, so as to cause diaphragm 3 to be displaced outwardly of chamber B. Obviously, if a pressure is also applied externally to the effective area of diaphragm 3, its effect will be translated by diaphragm 3 to the bellows 1 exactly as in the case of diaphragm 2, but in the opposite sense, and there will result a net displacement of the end of bellows 1 in proportion to the difference in the pressures applied to said diaphragms.

At this point, it will be observed that, liquids being substantially incompressible for most purposes, bellows 1 is rigidly coupled to the diaphragms. Next, if diaphragms 2 and 3 are quite stiff, and are each much greater in effective area than bellows 1, the net displacement of liquid by diaphragm deflection in response to pressure can be very small, which means that if the lines H and L are filled with a sealing liquid just to the level of the bottom of conduit C (not shown in FIGURE 2), as little sealing liquid as desired may be made subject to being forced from a connection into the conduit C, if stiffness and effective areas are properly chosen. Thus, since any bellows requires a certain volumetric change for an extension or contraction of, say 0.120 inch from an unstressed configuration and having given a range of pressure differences to be encompassed by said extension, and a diaphragm area and stiffness can be chosen so that the maximum difference in said range will cause the said volumetric change, a bellows can be chosen which gives the desired extension or contraction for a volumetric change small enough not to cause head-errors in the connection of the differential pressure device. Conversely, whatever may be the basis for choosing a particular value of volumetric change, it is possible to chose a diaphragm area sufficiently large that the deformation or deflection of the diaphragms needed to displace the required volume is well within the linear portion of the diaphragms' deflection versus pressure characteristic. It is to be noted that the stiffness to be considered in determining the bellows extension for a given difference between the pressure applied to the diaphragms is the combined stiffness of both diaphragms and the bellows, although it is feasible to make bellows-stiffness negligibly small compared to diaphragm-stiffness.

In sum, if the diaphragms are alike in effective area and stiffness and much stiffer than the bellows, the overall sensitivity of the device, i.e., the value of bellows extension obtainable from a given pressure difference, is directly proportional to the ratio of the effective area of one diaphragm to the effective area of the bellows, and substantially inversely proportional to the combined stiffness of the diaphragms. The said sensitivity is fixed by the particular range of pressure differences involved. Hence, if either the stiffness factor or the area-ratio factor of the device is changed, the other factor must be changed in like fashion, in order to avoid changing the sensitivity, unless, of course, sensitivity change is also desired.

If the diaphragms are unlike in effective area, the motion output of the transmitter will vary not only in accordance with pressure differential, but also in accordance with the level of the pressures involved. That is, if the pressures in connections H and L were varied while maintaining a constant difference between said pressures, stem 12 would move in accordance with such variation, if diaphragm areas were unequal.

It is true that the principle of hydraulic amplification is and has long been widely known. Moreover, those skilled in the art are well aware of the fact that stiff pressure-responsive elements or walls, as for example, plate-type metal diaphragms, C-type Bourdon tubes, etc., behave nonlinearly in response to pressure, and exhibit hysteresis if more than a relatively minute amount of element motion results in response to such pressure. Likewise, it is known that bellows, multi-turn Bourdon tubes, etc., in comparison to said stiff pressure-responsive elements, will exhibit a relatively large low-hysteresis movement substantially linearly related to a given pressure, where the same pressure in a stiff element will result in a comparatively minute linear movement. Again, the expedients of utilizing separating or protecting means between a pressure-responsive element and the pressure it is to respond to, and of hydraulically coupling said means and said element, are also known.

However, insofar as I am aware, none before me has combined the above recited teachings to obtain a number of subtle advantages over the prior art that are not immediately apparent.

For example, any differential pressure sensing device must have an overall stiffness sufficient to withstand a certain range of pressure differences to be encountered in the use of the device. If this stiffness is lumped in one element such as a bellows or diaphragm, and linearity is desired, the necessary stiffness is so great that the deflection of such bellows or diaphragm is unsatisfactorily small and must be amplified somehow. Again, if a bellows or diaphragm is quite flexible, the necessary stiffness must be supplied by an additional element, namely, a calibrated range spring opposing deflection of such bellows or diaphragms and which would generally allow of a larger linear motion output, than in the case where all the stiffness is supplied by the diaphragm or bellows. Finally, if these types of differential pressure sensing devices are supplemented by fluid separating diaphragms or bellows and a liquid fill, such separating elements are desirably slack and contribute only the function of separation and retention of the liquid fill. With my invention, however, the inherent characteristics of a relatively stiff pressure-responsive element and of a relatively flexible pressure-responsive element allow relatively large linear motion ouptut in response to pressure and the necessary overall stiffness, without resort to additional springs and/or motion amplification. Moreover, the outer elements (e.g., diaphragms 2 and 3) not only serve as separating devices and major sources of stiffness, but also provide hydraulic amplification. No hydraulic amplification results from a slack diaphragm, since the latter is effectively nothing but an interface between the aforesaid liquid fill and the pressure fluid applied to the slack diaphragm. In other words, in providing substantially all the stiffness in the center wall, the prior art must utilize the elastic strain of that stiffness for a motion output directly from the center wall, whereas in my invention the provision of much or nearly all of the stiffness in the outer walls leads to amplification of the outer wall motion (which motion corresponds to the said strain) within the device, so that a device according to my invention produces a motion output not requiring further amplification at a point where a corresponding prior art device would produce a motion output requiring further amplification or equivalent treatment.

In general, it is not practical to attempt to manufacture diaphragms and bellows in a great variety of stiffnesses and with such low tolerances, that it is possible to choose a pair of diaphragms and a bellows which, when assembled into a device according to FIGURE 1, will provide the exact pressure range desired. Therefore, in practice the bellows will be provided with a touch-up spring chosen to supplement the bellows and diaphragm stiffness so that the overall stiffness of the device is sufficient to permit the range of bellows deformation desired for a given range of pressure differences. However, this manufacturing expedient is not an essential of the device of FIGURE 1. A range spring, however, is essential in prior art devices wherein a single element such as a bellows must both absorb the full pressure differential and undergo a large deformation, in order to produce a motion output such as my invention can achieve without a range spring.

Since the diaphragms are required to deflect so little to obtain large bellows motions, it is comparatively easy to provide diaphragms that are quite linear and hysteresis-free in normal usage. Likewise for the bellows since it is not required to take up a great part of the pressure differential to be responded to, and may be made as flexible as desired. Moreover, if the bellows is so flexible as to possess, say 10 percent of the overall stiffness of the device, as much as 10 percent error due to bellows non-linearity and/or hysteresis would only contribute one percent to the error in the response of the device as a whole.

Again, the effective areas of metallic diaphragms and bellows are practically invariable under the conditions of use here, and the stability and impermeability of metallic diaphragm and bellows material can be taken advantage of.

At first sight, it might seem that thermal difficulties might be encountered but, in practice, thermal coupling of the parts of the device is sufficiently close that thermal expansions and contractions of the liquid therein and of the parts of the device, which are symmetrical with respect to the bellows, cancel out. Moreover, the effect of temperature in the body 4 and its contents can be minimized by keeping the volume of liquid therein between the sealing diaphragms as low as possible, which means making the various chambers and passages just large enough to provide for the proper motions of the liquid and the various moving parts in the body 4. Moreover, the said chambers and passages should be so proportioned that the bellows divides the said volume of liquid into two equal parts, in order to preserve thermal symmetry. As for elastic properties, along with stability of composition, metallic diaphragm materials (and metallic bellows materials, of course) are known for having elastic properties that change relatively little over wide ranges of temperature, e.g., the high chrome content ferrous alloy Ni-Span-C, for example. Moreover, the usual stainless steels utilized in diaphragm manufacture will permit a change of hundreds of degrees without affecting the overall response of the differential pressure responsive by more than one or two percent.

The actual design shown in FIGURE 1 is subject to certain variations. For example, the diaphragms 2 and 3 could be replaced by bellows of equivalent effective area and elastic properties and, although compactness of the design would therefore suffer, the functional characteristics would not be substantially changed, provided care is taken to keep the volume of confined liquid to a minimum, and to maintain good thermal contact among the elements of the device. Moreover, where solids may be deposited by the pressure fluids, fouling of diaphragm corrugations by such solids does not occur as readily nor interfere with diaphragm deflection, as with bellows, the convolutions of which readily retain solid deposits.

Likewise, the motions of stem 22 could be utilized externally of body 4 by provision of suitable motion transmission means, such as that disclosed in Binckley Patent 1,827,560, October 13, 1931, for transmitting motions of stem 22 through some simple and reliable linkage to an externally-mounted pointer, or the like. With the relatively large motions of stem 22, no need for motion amplification exists such as would require the use of complex and delicate linkage arrangements of the type ordinarily provided for purposes of amplification of the relatively small output motions of prior art pressure responsive mechanisms.

It is to be remarked that the term "diaphragm" as used here denotes a more or less plate-like wall, usually circular and corrugated, having a fixed peripheral mounting so that if pressure is applied to the wall it is strained throughout its extent from the periphery inward. Such configuration is ideal for my purpose since the proper stiffness and low-displacement factors are obtained with a single compact element. While it would be possible to use comparatively flexible diaphragms supplemented by springs of the proper stiffness, such construction is not necessary in practice, and I prefer to utilize diaphragms sufficiently stiff in themselves.

Such modifications as these would occur almost without thought to those skilled in the art, and it is therefore unnecessary to describe them further.

The drawing is illustrative of the proportions of an actual device according to the invention, but, as evident from the description, body 4 generally would be built up of a greater number of parts than actually delineated in the drawing. Moreover, the device of FIGURE 1, if constructed according to prevailing practice, would utilize circular diaphragms, a cylindrical bellows, and so on. I do not deem it necessary to illustrate such commonplaces of structural features since, to those skilled in the art, the drawing and its description in the specification will be sufficient instruction in the mode of making and using my invention.

It will be seen from the foregoing that my invention is a substantial advance in the art to which it pertains, and as such is entitled to the benefits of U.S. Letters Patent.

Hence, having observed the statutory requirements of setting forth the use, nature and best mode of construction of my invention known to me at this time, I claim:

1. A chambered body having walls enclosing a liquid, portions of said walls being composed of elastic material and being elastically deformable inwardly and outwardly of a chamber in said body, said chamber being entirely filled with said liquid, one of said portions being arranged to have a fluid pressure directly applied thereto externally of said chamber for deforming said wall inwardly of said chamber, whereby to deform another of said portions outwardly of said chamber, said one of said portions being larger in effective area than the said another portion, and also being stiffer than said another portion, whereby deformation of said one portion inwardly of said chamber in terms of its linear displacement inwardly of said chamber is transformed by hydraulic amplification into a much larger linear displacement of said another portion outwardly of said chamber; said body also including a liquid-filled second chamber, a third portion of said walls like the said one portion is provided and is arranged to be deformable inwardly and outwardly of said second chamber, the said chambers being arranged in said body so that said another portion of said walls is common to both said chambers, the arrangement being that if said another portion is deformed outwardly of one of said chambers, it at the same time is deformed inwardly of the other of said chambers; said third portion being arranged to have a second fluid pressure applied thereto externally, whereby said another portion deforms inwardly of one chamber and outwardly of the other in correspondence to difference in said fluid pressure to provide a linear displacement also corresponding to said difference.

2. In combination, a relatively stiff, large-effective-area, pressure responsive diaphragm, a relatively flexible, small effective area bellows, a conduit-portion having one end closed by the effective area of said diaphragm and its other end closed by the effective area of said bellows, a liquid filling said conduit-portion between said areas and comprising the sole connection between said effective areas, whereby relatively small linear displacements of the effective area of said diaphragm cause relatively large linear displacements of the effective area of said bellows; a second diaphragm like the first-mentioned diaphragm, a second conduit-portion having one end closed by the effective area of said bellows and its other end closed by the effective area of said second diaphragm, a liquid filling said second conduit-portion between said areas and comprising the sole connection therebetween; said diaphragms and bellows being arranged in series with said bellows between said diaphragms and separated therefrom by the liquid in said conduit-portions, whereby relatively small linear displacements of said diaphragms under the influence of pressures applied thereto externally of said conduit-portions result in relatively large linear displacements of said bellows, when the pressure applied to one of said diaphragms differs from the pressure applied to the other of said diaphragms.

3. A differential pressure responsive device comprising a liquid-filled hollow casing, said casing being defined by a continuous wall separating the interior of said casing from the external atmosphere, a flexible wall in said casing separating said casing interior into two portions substantially hermetically sealed from one another, part of said continuous wall on one side of said flexible wall being flexible, and part of said continuous wall on the other side of flexible wall being flexible; each said part and said flexible wall elastically opposing movement thereof tending to displace liquid from one said casing portion to another, the effective area of each of said parts being relatively large compared to the area of said flexible wall, means for exposing the exterior areas of each of said parts individually and simultaneously to a different one of two pressures the difference in which is to be sensed, and the stiffness of each of said parts being large with respect to the stiffness of said flexible wall, whereby a given extent of motion of said parts due to a difference in said two pressures results in a larger extent of motion of said flexible wall as a result of hydraulic amplification.

4. In combination, a body having a pair of chambers therein, a pressure-responsive movable wall arranged in one of said chambers to divide said one of said chambers into two portions, and there being a passage in said body, said passage having one end opening into the other of said chambers and its other end opening into one of said portions; a stem connected to said movable wall and projecting through said passage into said other of said chambers and movable by said movable wall along said passage; valve means on a portion of said stem in said other of said chambers, said valve means being constructed to coact with said one end of said passage opening into said other of said chambers to seal the said one end of said passage if said rod is moved to contact said valve means with said one end; said body having a second passage therein, said second passage having one end opening into said other of said chambers and having its other end adapted for connection to a source of fluid pressure, and said valve means being constructed to coact with the said one end of said second passage to seal the said one end of said second passage if said stem is moved to contact said valve means with the said one end of said second passage; said body having a third passage therein having one end opening into the other of said portions of said one of said chambers and having its other end adapted for connection to a source of fluid pressure; said movable wall being arranged to move said stem as aforesaid when said other ends of said second and third passages are respectively connected to sources of pressure, a second movable wall arranged in said body and sealing said other end of said third passage from the first-mentioned movable wall, said second movable wall being larger in effective area and stiffer than said first-mentioned movable wall, whereby the movement of said stem is in accordance with the sense and magnitude of the difference, if any, between the pressures of said sources, and whereby said one ends of said first and second passages cooperate with said valve means to limit the amount of motion of said stem; a third movable wall sealing said other end of said second passage from said first-mentioned movable wall, said third movable wall being larger in effective area and stiffer than said first-mentioned movable wall, a liquid completely filling the spaces between said movable walls, whereby the pressures of said sources are transmitted to said first-mentioned movable wall via said second and third movable walls and said liquid, and whereby if the said valve means seals a said one end of said second and third passages in consequence of a difference between the magnitudes of said pressures, the movable wall against which the larger of said pressures is exerted will be supported against deformation by a solid body of liquid sealed off between said valve means and the last said movable wall, and the said first-mentioned movable wall will either be sealed off from said larger of said pressures by said valve means, or be supported against deformation by a solid body of liquid sealed between said valve means and said first-mentioned movable wall.

5. A pressure responsive device including a rigid body having a pair of effectively parallel dished faces opening away from each other; there being a chamber in said body between said faces, a first passage in said body having one end opening at one of said faces and its other end communicating with said chamber, a second passage in said body having one end opening at the other of said faces and its other end communicating with said chamber, and a third passage opening at one end into said chamber and opening at its other end at the external surface of said body at a place spaced from said faces; a first, plate-type, relatively-stiff, and relatively-large effective-area diaphragm covering said one of said faces at a spacing therefrom of the order of the distance through which said first diaphragm can be deflected in response to variable fluid pressure thereon and exhibit a linear variation of diaphragm deflection with respect to variation of said fluid pressure; a second diaphragm like said first diaphragm, except that said second diaphragm is arranged with respect to said other of said faces like said first diaphragm is arranged with respect to said one of said faces; a relatively-flexible, and relatively-small effective-area bellows substantially filling said chamber; a rigid structure substantially filling the interior of said bellows and said third passage, and being secured to the closed end of said bellows, the open end of said bellows surrounding the opening of said third passage into said chamber and being sealed around the last said opening to the inner surface of said chamber, and one of said first and second passages including said third passage so as to define that portion of the said one of said first and second passages which communicates with said chamber; rigid means covering the opening of said third passage at said surface of said body and hermetically sealing said third passage from the ambient atmosphere external to said body, said rigid means providing a space receiving said rigid structure and proportioned to be substantially filled by said structure, said space providing a continuation of said third passage; said structure being so constructed and proportioned as to be movable in a path along said third passage and its said continuation in said space, and the net volume of said chamber, said third passage and said space being of the order of the net volume of said structure and said bellows but sufficiently larger and longer than the last said net volume as to permit said structure and said bellows to move freely for a distance corresponding to that distance said closed end of said bellows would move were said bellows to undergo a volume change, in response to fluid pressure thereon, of a magnitude on the order of the volume intercepted by one of said diaphragms and the next adjacent one of said faces if the differential pressure across the last said one of said diaphragms were substantially zero; said passages, said chamber, said space, and the volume intercepted by each said diaphragm and the next adjacent one of said faces being solidly filled with liquid; and means actuated in response to motion of said srtucture along said path.

References Cited in the file of this patent

UNITED STATES PATENTS

| | | |
|---|---|---|
| 897,730 | Fulton | Sept. 1, 1908 |
| 1,805,802 | Browne | May 19, 1931 |
| 2,203,460 | Fieber | June 4, 1940 |
| 2,276,580 | Hofer | Mar. 17, 1942 |
| 2,301,031 | Ferguson | Nov. 3, 1942 |
| 2,359,168 | Somes et al. | Sept. 26, 1944 |
| 2,497,255 | Brown | Feb. 14, 1950 |
| 2,626,183 | Jacobs | Jan. 20, 1953 |
| 2,627,183 | Greenwood et al. | Feb. 3, 1953 |
| 2,747,614 | Gray | May 29, 1956 |
| 2,752,949 | Jones | July 3, 1956 |
| 2,778,986 | Eklund | Jan. 22, 1957 |
| 2,814,312 | Booth et al. | Nov. 26, 1957 |